April 15, 1969 — W. R. GEORGE — 3,438,840
DECORATIVE WOODEN BLOCK SURFACE
Filed July 6, 1965

Inventor:
William Rodney George
By
[signature] Flocks
Attorney

United States Patent Office 3,438,840
Patented Apr. 15, 1969

3,438,840
DECORATIVE WOODEN BLOCK SURFACE
William R. George, Barland, Dargle Rail, Lions River, Natal, Republic of South Africa
Filed July 6, 1965, Ser. No. 469,648
Claims priority, application Republic of South Africa, July 27, 1964, 64/3,525
Int. Cl. B32b *3/14, 21/04*
U.S. Cl. 161—38    6 Claims

ABSTRACT OF THE DISCLOSURE

A wooden block decorative surface including at least one wooden block having a cross-grained surface provided with a plurality of ring-shaped spaced beads secured to said surface forming the desired decorative pattern. Said block may be secured to a laminated base and provided with a surrounding wooden frame.

---

This invention relates to a decorative surface.

According to the invention, an article having a surface includes at least one wooden block having a series of spaced decorative elements affixed to at least one of its surfaces, in which the plane of the surface so decorated extends substantially transversely across the grain of the wood forming the block.

Preferably a series of wooden blocks is provided in side-by-side relationship to define a parquet-like surface to which the decorative elements are affixed.

Further features of the invention will become apparent from the following description of a specific embodiment of the invention, with reference to the accompanying drawings, which is given by way of example only.

Figure 1:
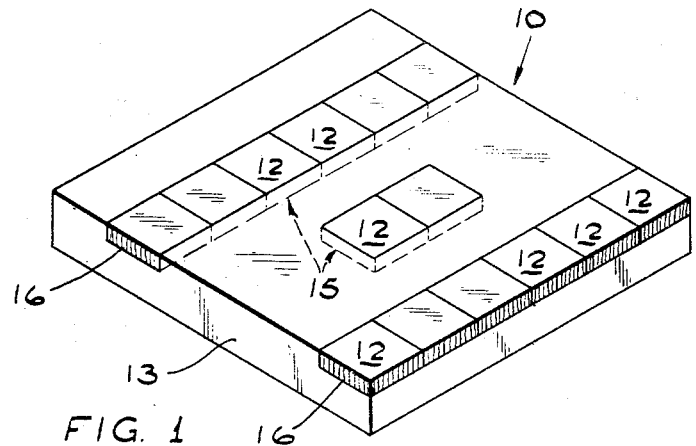
FIGURE 1 shows a three-dimensional view of one type of decorative surface produced according to the invention.

Reference numeral 10 refers generally to a decorative surface defined by a series of wooden blocks 12 mounted in side-by-side relationship on a backing 13 of rigid material, and having a series of spaced decorative bead elements 14 affixed to their upper surfaces.

Each wooden block 12 comprises a cross-grained layer 16 in which the grain of the wood extends substantially transversely to the decorated surface.

Figure 2:
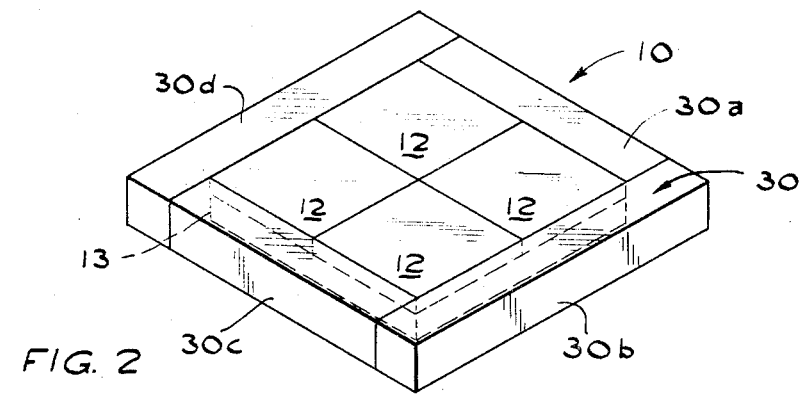
FIGURE 2 shows a three-dimensional view of a decorative surface comprising a plurality of cross-grained wooden blocks, a backing and a surrounding frame in an assembled position.
Figure 3:
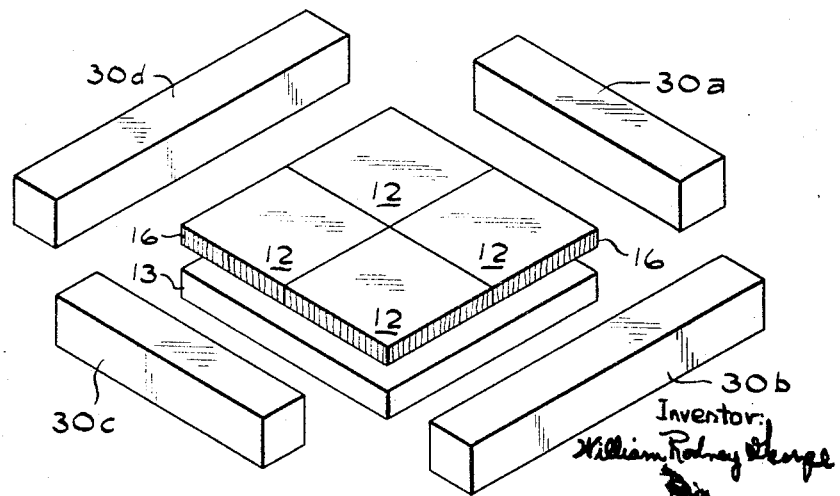
FIGURE 3 shows an exploded view of the decorative surface shown in FIGURE 2.

The backing 13 may be of unlaminated form, as shown in FIGURES 1, 2 and 3 of the drawings, and may be of material such as wood, synthetic plastic material or metal. In this construction, as shown in FIGURE 1, the blocks 12 are mounted in cavities 15 recessed into the backing in such a way that a flush outer surface is provided. The blocks 12 are conveniently adhesively secured to the backing.

Figure 4:
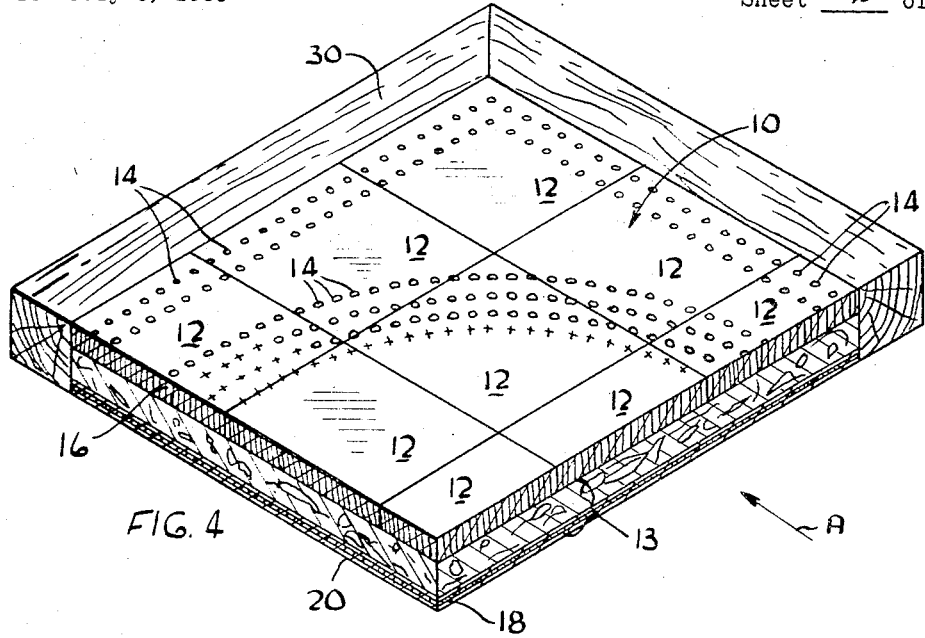
FIGURE 4 shows a part sectional three-dimensional view of another type of decorative surface produced according to the invention.
Figures 5, 6:
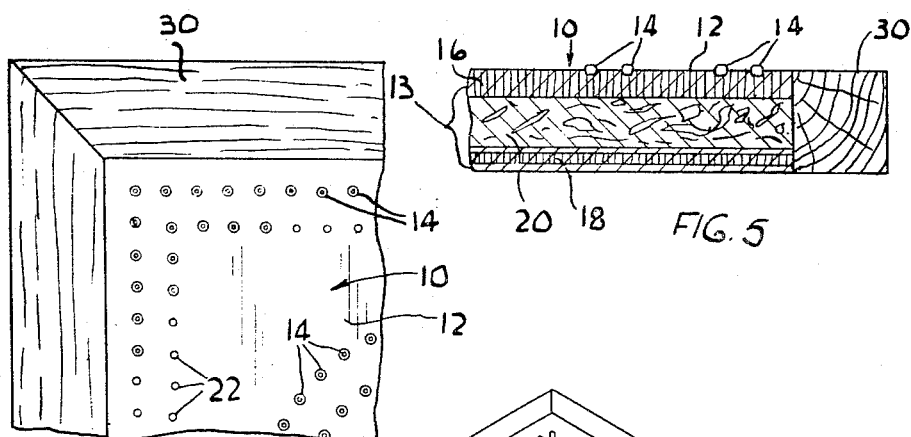
FIGURE 5 shows a fragmentary end elevation looking in the direction of arrow A in FIGURE 1.
FIGURE 6 shows a detail fragmentary plan view of the upper corner region of FIGURE 1.
Figure 7:
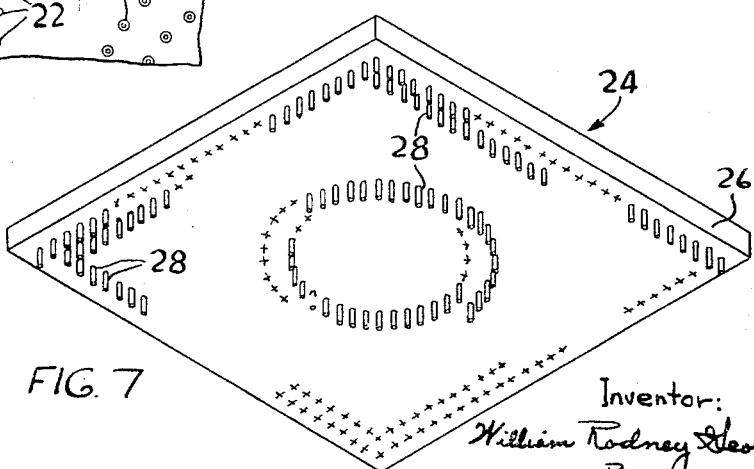
FIGURE 7 shows an underside three-dimensional view of a suitable tool arrangement for making a pattern of identations on a decorative surface.

Alternatively, the backing 13 may be of laminated form as shown in FIGURES 4 and 5 of the drawings. In this construction, the laminated form is defined by a bottom layer 18 of plywood, and a layer 20 of compressed wood-chip material sandwiched between the cross-grained layer 16 and the bottom layer 18. The blocks 12 may be adhesively secured to one another and to the layer 20, and the layer 20 may similarly be adhesively secured to the layer 18.

The backing 13, by being of rigid material, is advantageous in compensating for movement, such as by warping, which may take place between the respective blocks 12.

The decorative bead elements 14 are of ring-like shape, and are either directly affixed to the cross-grained layer 16 of the wooden blocks 12, or within mating ring-like indentations 27 provided in the layer 16. The bead elements 14 preferably stand slightly proud of the surface of the blocks 12 when in position, and may be multicoloured.

The spaced ring-like indentations 22 may be simultaneously produced in a predetermined pattern by means of a tool arrangement referred to generally under reference numeral 24 in FIGURE 4. The tool arrangement 24 comprises a base plate 26 to which are affixed a series of spaced hollow punch-like tools 28 arranged in a predetermined pattern on base plate 26.

The annular edges defined at the ends of the hollow punch-like tools 28 are preferably sharpened and are of such diameter so as to be adapted to make the circular indentations 22 on the wooden blocks 12 in which the ring-like bead elements 14 are snugly receivable. The bead elements 14 may be driven or pressed into these indentations by any suitable means such as by hammering, so that some of the wood fibres may be forced into the opening of each bead element and assist in securing it in position. Alternatively, the bead elements 14 may be driven or pressed directly into the wooden blocks 12 without first providing ring-like indentations.

A surrounding frame 30 may be provided around the blocks 12 and around the backing 13, and this frame may consist of a plurality of members 30a, 30b, 30c, 30d as shown in FIGURE 3. The frame members are conveniently adhesively secured to one another and to the blocks 12 and to the backing 13 in an assembled position as shown in FIGURE 2.

The surrounding frame 30 may be a wooden frame as shown in FIGURES 4, 5 and 6, and may be adhesively secured to the layers 16, 18 and 20. Preferably the grain of the wood forming the frame extends substantially transversely to the grain of the wood forming the cross-grained layer 16 to ensure longitudinal stiffness of the frame members.

The frame 30 is advantageous in preventing chipping, spalling, splintering or breaking away of the exposed edges of the cross-grained layer 16 and of the layers 18 and 20.

At least the upper surface of the blocks 12 may be coated with a moisture-proof coating, such as an epoxy resin sealer and varnish.

What is claimed is:

1. An article having a decorated surface and comprising at least one wooden block having a cross-grained surface and a plurality of spaced ring-shaped beads affixed to the cross-grained surface, the beads being retained in the cross-grained surface by grains of the surface protruding into the bores of the beads.

2. An article as claimed in claim 1, in which a series of wooden blocks is provided in side-by-side relationship to define a parquet-like surface to which the decorative elements are affixed.

3. An article as claimed in 1, in which said wooden block is mounted on a rigid backing of a laminated form.

4. An article as claimed in claim 3, which includes a surrounding frame around the block and around the backing, the surrounding frame being of wood and having the grain of the wood extending substantially transversely to the grain of the wooden block.

5. An article as claimed in claim 3, in which said block is mounted in a cavity recessed into the backing.

6. An article as claimed in claim 3, in which the laminations of the backing include at least a bottom layer of plywood and a layer of compressed wood-chip material sandwiched between this bottom layer and/or each block.

References Cited

UNITED STATES PATENTS

| | | | |
|---|---|---|---|
| 186,180 | 1/1877 | Thornton et al. | 161—37 |
| 1,480,880 | 1/1924 | Brennan | 161—8 |
| 1,935,480 | 11/1933 | Mencken | 156—63 |
| 2,034,313 | 3/1936 | Russell | 161—18 |
| 2,139,880 | 12/1938 | Colucci | 161—44 |
| 2,287,573 | 6/1942 | Schneider. | |
| 2,831,794 | 4/1958 | Elmendorf. | |
| 2,982,042 | 5/1961 | Gick | 161—5 |

ROBERT F. BURNETT, *Primary Examiner.*

WILLIAM A. POWELL, *Assistant Examiner.*

U.S. Cl. X.R.

156—63, 298; 161—39, 44, 56